(12) United States Patent
Inoue et al.

(10) Patent No.: US 9,157,525 B2
(45) Date of Patent: Oct. 13, 2015

(54) AUTOMATIC TRANSMISSION AND METHOD FOR CONTROLLING SAME

(71) Applicants: JATCO LTD, Fuji-shi, Shizuoka (JP); NISSAN MOTOR CO., LTD., Yokohama-shi, Kanagawa (JP)

(72) Inventors: Takuichiro Inoue, Fujisawa (JP); Hiroyasu Tanaka, Atsugi (JP); Mamiko Inoue, Ebina (JP); Seiichiro Takahashi, Isehara (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/387,749

(22) PCT Filed: Feb. 21, 2013

(86) PCT No.: PCT/JP2013/054383
§ 371 (c)(1),
(2) Date: Sep. 24, 2014

(87) PCT Pub. No.: WO2013/145970
PCT Pub. Date: Oct. 3, 2013

(65) Prior Publication Data
US 2015/0105988 A1    Apr. 16, 2015

(30) Foreign Application Priority Data
Mar. 28, 2012 (JP) .................................. 2012-074911

(51) Int. Cl.
G06F 17/00 (2006.01)
F16H 61/06 (2006.01)
F16H 59/46 (2006.01)

(52) U.S. Cl.
CPC .............. *F16H 61/061* (2013.01); *F16H 59/46* (2013.01); *B60Y 2300/18075* (2013.01); *F16H 2061/064* (2013.01)

(58) Field of Classification Search
None
See application file for complete search history.

(56) References Cited

U.S. PATENT DOCUMENTS

| 5,029,678 A * | 7/1991 | Koshizawa ..................... 192/76 |
| 5,337,874 A * | 8/1994 | Oltean et al. ............. 192/70.252 |
| 5,393,274 A * | 2/1995 | Smedley .......................... 477/74 |
| 6,189,665 B1 * | 2/2001 | Yamamoto et al. .......... 192/3.58 |

(Continued)

FOREIGN PATENT DOCUMENTS

| JP | 2008-025638 A | 2/2008 |
| JP | 2008-106814 A | 5/2008 |
| JP | 2011-038634 A | 2/2011 |

*Primary Examiner* — Dirk Wright
(74) *Attorney, Agent, or Firm* — Foley & Lardner LLP

(57) ABSTRACT

The automatic transmission includes a first friction engagement element which is engaged when a first gear position is realized and disengaged when a second gear position is realized, a second friction engagement element which is engaged when the second gear position is realized and disengaged when the first gear position is realized, and a controller. The controller causes the second friction engagement element to slip by decreasing an instructional pressure for the second friction engagement element while running in the second gear position, and learns an engagement start pressure of the first friction engagement element based on a change in a differential rotation of the second friction engagement element, or in a parameter that changes in accordance with the differential rotation, at a time when an instructional pressure for the first friction engagement element is increased during the slip.

18 Claims, 3 Drawing Sheets

(56) References Cited

U.S. PATENT DOCUMENTS

| | | | |
|---|---|---|---|
| 8,260,510 B2* | 9/2012 | Otsubo | 701/51 |
| 2008/0269012 A1 | 10/2008 | Tanaka et al. | |
| 2009/0240410 A1* | 9/2009 | Shinohara et al. | 701/59 |
| 2011/0015840 A1 | 1/2011 | Takahashi et al. | |

* cited by examiner

AUTOMATIC TRANSMISSION AND METHOD FOR CONTROLLING SAME

TECHNICAL FIELD

The present invention relates to an automatic transmission, and to a learning control of an engagement start pressure of a friction engagement element.

BACKGROUND ART

An automatic transmission includes two or more friction engagement elements (a clutch, a brake) whose engagement states can be hydraulically switched. The automatic transmission switches among power transmission paths by causing one friction engagement element to be engaged while another friction engagement element is disengaged, thereby realizing shift and switching between forward and reverse movements.

Some automatic transmissions perform neutral idle control for improving fuel economy while a vehicle is stopped. According to this control, while the vehicle is stopped, the engine load is decreased by placing a friction engagement element used in starting the vehicle in a state that immediately precedes the engagement, thus setting an engagement capacity thereof to zero.

In order to realize a smooth start, shock-reduced shift, and neutral idle control, it is important to correctly discover a hydraulic pressure (engagement start pressure) at which a friction engagement element starts to hold a transmission capacity (transmittable torque).

In view of this, automatic transmissions learn an engagement start pressure of a friction engagement element while a vehicle is stopped (JP 2008-106814A). In the course of learning, a hydraulic pressure supplied to a friction engagement element targeted for learning is increased and decreased. An engagement start pressure of this friction engagement element is learnt based on a resultant change in a rotation speed of a rotation element of the automatic transmission.

SUMMARY OF INVENTION

Meanwhile, due to the increasing demand for improved fuel economy in recent years, idling stop techniques for automatically shutting down an engine while a vehicle is stopped are progressively being adopted. For this reason, there are fewer occasions to learn the aforementioned engagement start pressure of a friction engagement element while a vehicle is stopped. This creates the necessity to ensure the occasions for learning separately.

It is an object of the present invention to ensure the occasions for learning by enabling a learning control of an engagement start pressure of a friction engagement element, even while a vehicle is running.

According to one aspect of the present invention, an automatic transmission mounted on a vehicle is provided. The automatic transmission includes: a first friction engagement element that is engaged when a first gear position is realized, and is disengaged when a second gear position is realized; a second friction engagement element that is engaged when the second gear position is realized, and is disengaged when the first gear position is realized; and a learning control means for causing the second friction engagement element to slip by decreasing an instructional pressure for the second friction engagement element while running in the second gear position, and learning an engagement start pressure of the first friction engagement element based on a change in a differential rotation of the second friction engagement element, or in a parameter that changes in accordance with the differential rotation, at a time when an instructional pressure for the first friction engagement element is increased during the slip.

According to another aspect of the present invention, a control method for an automatic transmission is provided. The automatic transmission is mounted on a vehicle and includes a first friction engagement element and a second friction engagement element, the first friction engagement element being engaged when a first gear position is realized and disengaged when a second gear position is realized, and the second friction engagement element being engaged when the second gear position is realized and disengaged when the first gear position is realized. The control method causes the second friction engagement element to slip by decreasing an instructional pressure for the second friction engagement element while running in the second gear position, and learns an engagement start pressure of the first friction engagement element based on a change in a differential rotation of the second friction engagement element, or in a parameter that changes in accordance with the differential rotation, at a time when an instructional pressure for the first friction engagement element is increased during the slip.

According to these aspects, an engagement start pressure of a friction engagement element is learnt while a vehicle is running. Therefore, the occasions to learn an engagement start pressure of a friction engagement element can be ensured.

An embodiment and advantages of the present invention will be described in detail below with reference to the attached drawings.

DESCRIPTION OF EMBODIMENTS

Figure 1:
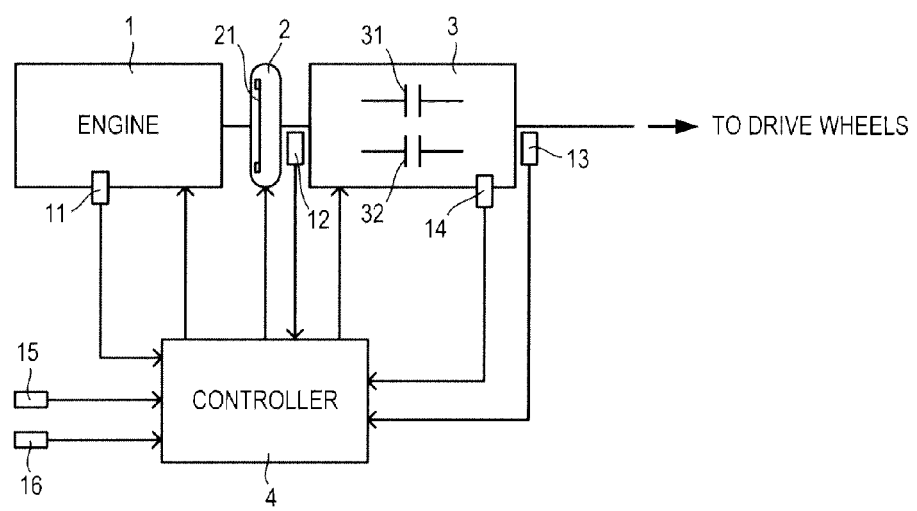
FIG. 1 is a schematic configuration diagram of a vehicle including an automatic transmission.

FIG. 1 shows a schematic configuration of a vehicle including an automatic transmission.

A powertrain of the vehicle includes an engine 1 as a power source, a torque converter 2 with a lock-up clutch 21, and an automatic transmission 3. The powertrain is configured such that an output rotation of the engine 1 is transmitted to drive wheels, not shown, via the torque converter 2 and the automatic transmission 3.

The automatic transmission 3 includes a first friction engagement element 31 and a second friction engagement element 32. A first gear position is realized when the first friction engagement element 31 is engaged and the second friction engagement element 32 is disengaged. A second gear position that has a smaller speed ratio than the first gear position is realized when the first friction engagement element 31 is disengaged and the second friction engagement element 32 is engaged. The first friction engagement element 31 and the second friction engagement element 32 are, for example, a multi-plate clutch or brake.

The automatic transmission 3 also includes friction engagement elements other than the first friction engagement element 31 and the second friction engagement element 32. Three or more gear positions including a reverse position can be realized by changing the engagement states of other friction engagement elements in addition to the first friction engagement element 31 and the second friction engagement element 32. To facilitate the understanding, the following description will be given under the assumption that there are two gear positions.

The engine 1, the lock-up clutch 21, and the automatic transmission 3 are integrally controlled by a controller 4. The controller 4 is composed mainly of a microprocessor. Signals from an engine rotation speed sensor 11, an input shaft rotation speed sensor 12, an output shaft rotation speed sensor 13, an oil temperature sensor 14, an acceleration sensor 15, an accelerator opening degree sensor 16, and the like are input to the controller 4. The engine rotation speed sensor 11 detects a rotation speed of the engine 1. The input shaft rotation speed sensor 12 detects a rotation speed of an input shaft of the automatic transmission 3. The output shaft rotation speed sensor 13 detects a rotation speed of an output shaft of the automatic transmission 3. The oil temperature sensor 14 detects an oil temperature of the automatic transmission 3. The acceleration sensor 15 detects acceleration and deceleration of the vehicle. The accelerator opening degree sensor 16 detects an opening degree of an accelerator pedal (the amount by which the accelerator pedal is depressed). The controller 4 determines an operation state of the vehicle based on the input signals, and controls the torque and rotation speed of the engine 1, an engagement state of the lock-up clutch 21, and a gear position of the automatic transmission 3 in accordance with the operation state.

Furthermore, in order to realize a smooth start and shock-reduced shift, it is necessary to control the engagement states of the first and second friction engagement elements 31, 32 based on correct engagement start pressures of the first and second friction engagement elements 31, 32 (pressures at which an engagement capacity starts to be generated). To this end, the controller 4 performs a learning control of the engagement start pressures of the friction engagement elements 31, 32 described below.

Figure 2:
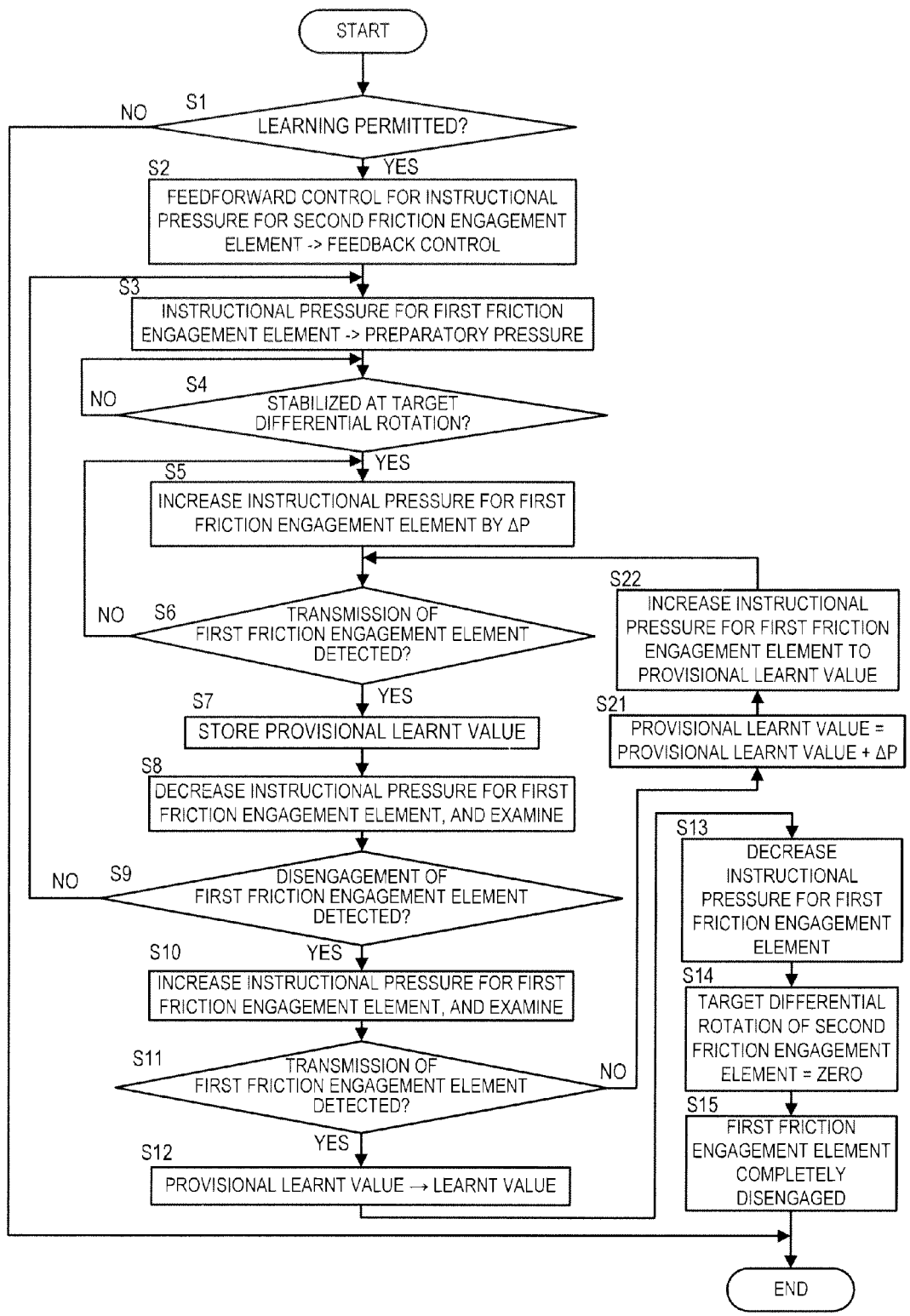
FIG. 2 is a flowchart showing the substance of a learning control of an engagement start pressure of a friction engagement element.

A description is now given of the learning control of the engagement start pressures of the friction engagement elements 31, 32 with reference to a flowchart of FIG. 2. The present control is not performed while the vehicle is stopped, but is performed while the vehicle is running. In the following description, a time chart shown in FIG. 3 (a time chart showing the course of the learning control) will be referred to where appropriate.

First, in S1, the controller 4 determines whether or not learning is permitted. Learning is permitted when all of the following conditions are satisfied.

An oil temperature of the automatic transmission 3 is higher than a warm-up completion oil temperature (warm-up of the automatic transmission 3 has been completed).

An absolute value of deceleration of the vehicle is smaller than a predetermined value (deceleration is considered not to cause the vehicle to stop upon sudden deceleration).

An accelerator opening degree is zero (during undepressed deceleration, i.e., during coasting).

The lock-up clutch 21 is engaged.

The second friction engagement element 32 is engaged.

A vehicle speed is in a predetermined vehicle speed range (a vehicle speed is considered not to stop the vehicle during the learning control, and even if the second friction engagement element 32 is caused to slip in a later-described manner, a decrease in durability of a friction member of the second friction engagement element 32 caused by the slip is in a tolerable range).

If learning is permitted, processing proceeds to S2. If learning is not permitted, processing is ended.

Figure 3:
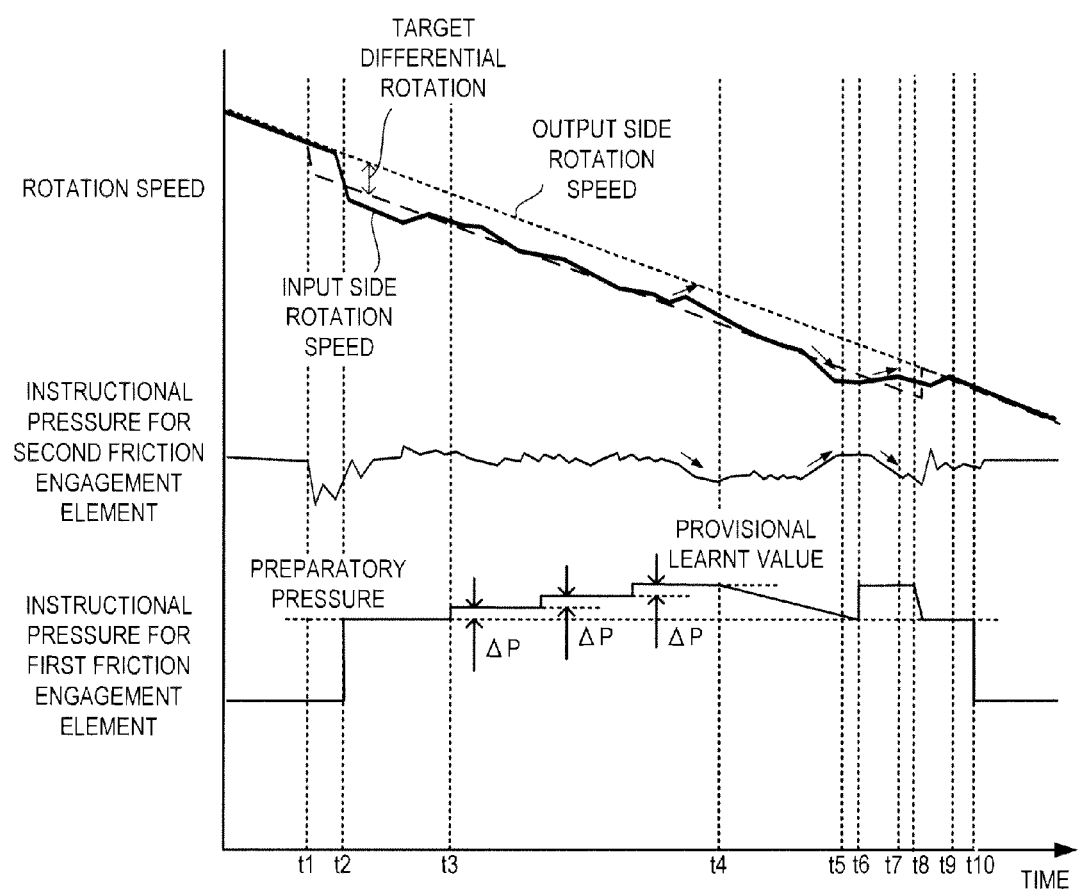
FIG. 3 is a time chart showing the course of the learning control of an engagement start pressure of a friction engagement element.

According to the time chart of FIG. 3, learning is permitted at time t1.

In S2, the controller 4 first performs feedforward control to decrease an instructional pressure for the second friction engagement element 32 by a factor of safety, at a predetermined ramp slope, to an instructional pressure that does not take the factor of safety into consideration. This is because, during normal running other than coasting, the instructional pressure for the second friction engagement element 32 takes the factor of safety into consideration to the extent that the second friction engagement element does not slide with respect to a transmission capacity of a friction element, and therefore the transmission capacity of the friction element is excessive.

Subsequently, the controller 4 sets a target value of a differential rotation between an input side rotation speed and an output side rotation speed of the second friction engagement element 32 (hereinafter referred to as "target differential rotation", e.g., 50 rpm), and starts feedback control for the instructional pressure for the second friction engagement element 32 so that the differential rotation matches the target differential rotation. Consequently, the instructional pressure for the second friction engagement element 32 is further decreased, thereby placing the second friction engagement element 32 in a slipping state. During the learning control described below, the feedback control for the instructional pressure for the second friction engagement element 32 is continuously performed.

During coasting, rotation is not transmitted from the engine 1, but is transmitted from an element on an output side to an element on an input side of the second friction engagement element 32 (input from a road surface), and the element on the input side rotates accordingly. Therefore, when the second friction engagement element 32 is in the slipping state, the input side rotation speed becomes lower than the output side rotation speed, and the differential rotation increases.

In the time chart of FIG. 3, at time t1 onward, the feedback control is performed for the instructional pressure for the second friction engagement element 32 so as to control the differential rotation of the second friction engagement element 32 to match the target differential rotation.

In S3, the controller 4 increases an instructional pressure for the first friction engagement element 31 to a preparatory pressure. The preparatory pressure is a value smaller than a learnt value of an engagement start pressure of the first friction engagement element 31 that is held by the controller 4 at that point in time. The first friction engagement element 31 remains disengaged even after the instructional pressure for the first friction engagement element 31 is increased to the preparatory pressure.

By increasing the instructional pressure for the first friction engagement element 31 in advance, a time period until the instructional pressure for the first friction engagement element 31 reaches the engagement start pressure can be shortened when the instructional pressure for the first friction engagement element 31 is increased in a staircase pattern, as will be described later.

In the time chart of FIG. 3, the instructional pressure for the first friction engagement element 31 is increased to the preparatory pressure at time t2.

In S4, the controller 4 determines whether or not the differential rotation of the second friction engagement element 32 has stabilized at the target differential rotation. For example, the controller 4 determines that the differential rotation of the second friction engagement element 32 has stabilized at the target differential rotation when the difference between the differential rotation and the target differential rotation has remained smaller than a predetermined value near zero for a predetermined time period. If it is determined that the differential rotation of the second friction engagement element 32 has stabilized at the target differential rotation, processing proceeds to S5. If it is not determined to that effect, the controller 4 waits until the differential rotation of the second friction engagement element 32 stabilizes at the target differential rotation.

In the time chart of FIG. 3, it is determined that the differential rotation of the second friction engagement element 32 has stabilized at the target differential rotation at time t3.

In S5, the controller 4 increases the instructional pressure for the first friction engagement element 31 by a predetermined unit pressure ΔP.

In S6, the controller 4 waits a predetermined time period from when the instructional pressure for the first friction engagement element 31 was increased in S5, and then determines whether or not the first friction engagement element 31 holds a transmission capacity. Specifically, the controller 4 determines that the first friction engagement element 31 holds the transmission capacity when the instructional pressure for the second friction engagement element 32 has decreased.

Whether or not the first friction engagement element 31 holds the transmission capacity can be determined based on the instructional pressure for the second friction engagement element 32 for the following reason.

When the first friction engagement element 31 holds the transmission capacity due to the increase in the instructional pressure for the first friction engagement element 31 in S5, the input shaft rotation speed of the automatic transmission 3 increases. Consequently, the input side rotation speed of the second friction engagement element 32 increases, and hence the differential rotation of the second friction engagement element 32 decreases.

As the feedback control is performed for the instructional pressure for the second friction engagement element 32 so that the differential rotation matches the target differential rotation, if the differential rotation decreases, the instructional pressure for the second friction engagement element 32 is decreased so as to increase the differential rotation to the target differential rotation.

In this way, when the first friction engagement element 31 holds the transmission capacity, the instructional pressure for the second friction engagement element 32 is decreased. Therefore, whether or not the first friction engagement element 31 holds the transmission capacity can be determined based on the instructional pressure for the second friction engagement element 32.

A change in the instructional pressure for the second friction engagement element 32 is attributed to a change in the differential rotation of the second friction engagement element. In view of this, whether or not the first friction engagement element 31 holds the transmission capacity may be determined directly based on a change in the differential rotation of the second friction engagement element, a change in the rotation speed of a rotation element that produces the differential rotation, a slip rate of the second friction engagement element, and the like.

The controller 4 waits the predetermined time period from when the instructional pressure for the first friction engagement element 31 was increased in S5 in consideration of a time lag between the increase in the instructional pressure for the first friction engagement element 31 and an increase in the actual pressure thereof, and a time lag between when the first friction engagement element 31 holds the transmission capacity and when the influence thereof is reflected in the instructional pressure for the second friction engagement element 32.

If it is determined that the first friction engagement element 31 does not hold the transmission capacity yet, processing returns to S5. Therefore, as long as it is determined that the first friction engagement element 31 does not hold the transmission capacity yet, the instructional pressure for the first friction engagement element 31 keeps getting increased by the unit pressure ΔP in a staircase pattern. If it is determined that the first friction engagement element 31 holds the transmission capacity, processing proceeds to S7.

In the time chart of FIG. 3, at time t3 onward, the instructional pressure for the first friction engagement element 31 keeps getting increased by the predetermined unit pressure ΔP. At t4 when the instructional pressure for the second friction engagement element 32 is decreased due to a decrease in the differential rotation, it is determined that the first friction engagement element 31 holds the transmission capacity.

In S7, the controller 4 stores the instructional pressure for the first friction engagement element 31 at that point in time as a provisional learnt value of the engagement start pressure of the first friction engagement element 31.

In S8 to S11, the controller 4 examines the reliability of the provisional learnt value. This is because the first friction engagement element 31 may hold the transmission capacity due to a disturbance (e.g., a fluctuation in a hydraulic pressure) in S6, in which case the provisional learnt value does not represent a correct engagement start pressure and the learning needs to be re-performed.

In S8, the controller 4 decreases the instructional pressure for the first friction engagement element 31, at a predetermined ramp slope, from the provisional learnt value to the preparatory pressure. If the instructional pressure for the first friction engagement element 31 is decreased suddenly in a state where the instructional pressure for the second friction engagement element 32 has been decreased, there is a possibility that the second friction engagement element 32 undergoes an excessive slip. To avoid this possibility, the instructional pressure for the first friction engagement element 31 is decreased at the ramp slope.

In S9, the controller 4 determines whether or not the first friction engagement element 31 is disengaged based on whether or not the instructional pressure for the second friction engagement element 32 has increased. This determination is possible because the feedback control is performed for the instructional pressure for the second friction engagement element 32 so that the differential rotation of the second friction engagement element matches the target differential rotation (similar to S6).

If the first friction engagement element 31 is not disengaged, the provisional learnt value does not represent a correct engagement start pressure, and therefore processing returns to S3 and the learning is re-performed. If the first friction engagement element 31 is disengaged, processing proceeds to S10.

In the time chart of FIG. 3, it is determined that first friction engagement element 31 is disengaged at time t5.

In S10, the controller increases the instructional pressure for the first friction engagement element 31 to the provisional learnt value in a stepwise manner.

In S11, the controller determines whether or not the first friction engagement element 31 is engaged based on whether or not the instructional pressure for the second friction engagement element 32 has decreased. This determination is possible because the feedback control is performed for the instructional pressure for the second friction engagement element 32 so that the differential rotation of the second friction engagement element 32 matches the target differential rotation (similar to S6).

If the first friction engagement element 31 is not engaged, it means that the provisional learnt value is smaller than the engagement start pressure, and therefore processing proceeds to S21, S22. That is to say, the provisional learnt value is increased by ΔP as correction, and the instructional pressure for the first friction engagement element 31 is increased to the increased provisional learnt value. Thereafter, processing returns to S6, and the learning is re-performed. If the first friction engagement element 31 is engaged, processing proceeds to S12.

In the time chart of FIG. 3, the instructional pressure for the first friction engagement element is increased to the provisional learnt value at time t6, and it is determined that the first friction engagement element 31 is engaged at time t7.

While the reliability of the provisional learnt value is examined both in the decreasing direction of the instructional pressure for the first friction engagement element 31 (S8 and S9) and in the increasing direction of the instructional pressure for the first friction engagement element 31 (S10 and S11) in the present embodiment, this examination may be conducted only in the decreasing direction of the instructional pressure for the first friction engagement element 31 (S8 and S9) for simplicity.

In S12, the controller 4 stores the provisional learnt value as a final learnt value. Through the examination processes of S8 to S11, it is confirmed that the first friction engagement element 31 is disengaged when the instructional pressure for the first friction engagement element 31 is decreased to the preparatory pressure, and that the first friction engagement element 31 is engaged when the instructional pressure for the first friction engagement element 31 is increased to the provisional learnt value. Therefore, the provisional learnt value is a correct value.

In S13 to S15, the controller 4 executes ending processes.

The controller 4 first decreases the instructional pressure for the first friction engagement element 31 to the preparatory pressure, thereby setting the transmission capacity of the first friction engagement element 31 to zero (S13). Next, the controller 4 sets the target differential rotation of the second friction engagement element 32 to zero, and performs the feedback control. When the differential rotation becomes zero, the controller 4 ends the feedback control for the instructional pressure for the second friction engagement element 32 (S14). Then, finally, the controller 4 causes the first friction engagement element 31 to be disengaged completely by decreasing the instructional pressure for the first friction engagement element 31 to a minimum pressure (S15), and ends the present learning control.

In the time chart of FIG. 3, the ending processes are executed from time t8 to time t10.

While the above has described a case in which the engagement start pressure of the first friction engagement element 31 is learnt, similar control is performed to learn an engagement start pressure of the second friction engagement element 32. That is to say, in order to learn the engagement start pressure of the second friction engagement element 32, the first friction engagement element 31 and the second friction engagement element 32 should be reversed in the processing of FIG. 2.

Below is a description of the operational effects achieved by performing the above-described learning control.

As the above-described learning control is performed while the vehicle is running, the occasions to learn the engagement start pressures of the friction engagement elements 31, 32 can be ensured. The above-described learning control is effective especially when it is applied to an idling stop vehicle, in which the engine 1 is shut down while the vehicle is stopped and the occasions for learning are difficult to ensure.

If the learning control is performed while running, it is preferable to perform the learning control during coasting, as in the present embodiment. During coasting, there is a small fluctuation in the torque of the engine 1, and therefore it is easy to determine whether or not a change in a differential rotation of a currently-slipping friction engagement element that is not targeted for learning, or in parameters (an instructional pressure, a rotation speed of a rotation element, a slip rate, and the like) that change in accordance with the differential rotation, is attributed to the engagement or disengagement of a friction engagement element targeted for learning. In this way, the engaging start pressures of the friction engagement elements 31, 32 can be learnt with high accuracy.

By increasing the instructional pressure for the friction engagement element targeted for learning in a staircase pattern during the learning control, the instructional pressure at which the friction engagement element targeted for learning starts to hold the engagement capacity can be correctly discovered, and the accuracy of learning the engagement start pressure is improved.

During the learning control, if the feedback control is performed for the instructional pressure for the friction engagement element that is not targeted for learning so that the differential rotation matches the target differential rotation, whether or not the friction engagement element targeted for learning holds the engagement capacity can be determined based on a change in the instructional pressure for the friction engagement element that is not targeted for learning at the time of the engagement or disengagement of the friction engagement element targeted for learning. Furthermore, even if the differential rotation changes while learning due to the engagement or disengagement of the friction engagement element targeted for learning, the differential rotation is restored to the target differential rotation through the feedback control. Consequently, the vehicle undergoes small acceleration and deceleration, and a sense of discomfort felt by a driver can be suppressed.

In addition, whether or not a learnt value of an engagement start pressure is a correct value is examined by determining whether or not an engagement state of the friction engagement element targeted for learning changes between a disengaged state and an engaged state while increasing and decreasing the instructional pressure for the friction engagement element targeted for learning from an engagement start pressure obtained through learning. In this way, a more reliable engagement start pressure can be obtained.

This concludes the description of the embodiment of the present invention. It should be noted that the above-described embodiment merely illustrates a part of examples of application of the present invention, and is not intended to restrict a technical scope of the present invention specifically to the above-described embodiment.

For example, while the automatic transmission 3 is a transmission with a plurality of gear positions in the above-described embodiment, a continuously variable transmission may be provided in a front stage or a rear stage relative to the automatic transmission 3. In this case, the automatic transmission 3 serves as an auxiliary transmission attached to the continuously variable transmission.

Moreover, the present invention is not intended to prohibit learning while the vehicle is stopped. Learning may be performed also while the vehicle is stopped in addition to the above-described learning control. In this way, the occasions for learning can be further ensured.

The present application claims the benefit of priority from Japanese Patent Application No. 2012-74911, filed in the Japan Patent Office on Mar. 28, 2012, the disclosure of which is incorporated herein by reference in its entirety.

The invention claimed is:

1. An automatic transmission mounted on a vehicle, comprising:
   a first friction engagement element that is engaged when a first gear position is realized, and is disengaged when a second gear position is realized;
   a second friction engagement element that is engaged when the second gear position is realized, and is disengaged when the first gear position is realized;
   a shift determination unit configured to determine whether or not a current state is a state in which the automatic transmission does not perform shift, the state involving a predetermined vehicle operation state and an engaged state of one of the friction engagement elements;
   a learning permission determination unit configured to determine that learning is permitted if the shift determination unit determines that the current state is the state in which the shift is not performed; and
   a learning control unit configured to, if the learning permission determination unit determines that the learning is permitted, cause the one of the friction engagement elements to slip by decreasing an instructional pressure for the one of the friction engagement elements, and learn an engagement start pressure of the other one of the friction engagement elements based on a change in a differential rotation of the one of the friction engagement elements, or in a parameter that changes in accordance with the differential rotation of the one of the friction engagement elements, at a time when an instructional pressure for the other one of the friction engagement elements is increased.

2. The automatic transmission according to claim 1, wherein the learning control unit learns an engagement start pressure of the other one of the friction engagement elements while coasting in the second gear position.

3. The automatic transmission according to claim 1, wherein the learning control unit learns the engagement start pressure of the other one of the friction engagement elements based on the change in the differential rotation of the one of the friction engagement elements, or in the parameter that changes in accordance with the differential rotation of the one of the friction engagement elements, at a time when the instructional pressure for the other one of the friction engagement elements is increased in a staircase pattern.

4. The automatic transmission according to claim 1, wherein the learning control unit performs feedback control for the instructional pressure for the one of the friction engagement elements so that the differential rotation of the one of the friction engagement elements matches a target differential rotation, and learns, as the engagement start pressure of the other one of the friction engagement elements, the instructional pressure for the other one of the friction engagement elements at a time when the instructional pressure for the one of the friction engagement elements changes to reduce a deviation of the differential rotation of the one of the friction engagement elements from the target differential rotation, the deviation being caused by increasing the instructional pressure for the other one of the friction engagement elements.

5. The automatic transmission according to claim 3, wherein the learning control unit determines that a learnt value of the engagement start pressure is a correct value if the instructional pressure for the one of the friction engagement elements changes when the instructional pressure for the other one of the friction engagement elements is decreased from the learnt value of the engagement start pressure.

6. The automatic transmission according to claim 3, wherein the learning control unit determines that a learnt value of the engagement start pressure is a correct value if the instructional pressure for the one of the friction engagement elements changes when the instructional pressure for the other one of the friction engagement elements is decreased from the learnt value of the engagement start pressure, and the instructional pressure for the one of the friction engagement elements changes again when the decreased instructional pressure for the other one of the friction engagement elements is increased to the learnt value of the engagement start pressure.

7. A control method for an automatic transmission that is mounted on a vehicle and includes a first friction engagement element and a second friction engagement element, the first friction engagement element being engaged when a first gear position is realized and disengaged when a second gear position is realized, and the second friction engagement element being engaged when the second gear position is realized and disengaged when the first gear position is realized, the control method comprising:
   determining whether or not a current state is a state in which the automatic transmission does not perform shift, the state involving a predetermined vehicle operation state and an engaged state of one of the friction engagement elements;
   determining that learning is permitted if it is determined that the current state is the state in which the shift is not performed;
   causing the one of friction engagement elements to slip by decreasing an instructional pressure for the one of the friction engagement elements if it is determined that the learning is permitted; and
   learning an engagement start pressure of the other one of the friction engagement elements based on a change in a differential rotation of the one of the friction engagement elements, or in a parameter that changes in accordance with the differential rotation of the one of the friction engagement elements, at a time when an instructional pressure for the other one of the friction engagement elements is increased.

8. The control method according to claim 7, wherein an engagement start pressure of the first friction engagement element is learnt while coasting in the second gear position.

9. The control method according to claim 7, wherein the engagement start pressure of the other one of the friction engagement elements is learnt based on the change in the differential rotation of the one of the friction engagement elements, or in the parameter that changes in accordance with the differential rotation of the one of the friction engagement elements, at a time when the instructional pressure for the other one of the friction engagement elements is increased in a staircase pattern.

10. The control method according to claim 7, wherein feedback control is performed for the instructional pressure for the one of the friction engagement elements so that the differential rotation of the one of the friction engagement elements matches a target differential rotation, and the instructional pressure for the other one of the friction engagement elements at a time when the instructional pressure for the one of the friction engagement elements changes to reduce a deviation of the differential rotation of the one of the friction engagement elements from the target differential rotation is learnt as the engagement start pressure of the other one of the friction engagement elements, the deviation being caused by increasing the instructional pressure for the other one of the friction engagement elements.

11. The control method according to claim 9,
wherein it is determined that a learnt value of the engagement start pressure is a correct value if the instructional pressure for the one of the friction engagement elements changes when the instructional pressure for the other one of the friction engagement elements is decreased from the learnt value of the engagement start pressure.

12. The control method according to claim 9,
wherein it is determined that a learnt value of the engagement start pressure is a correct value if the instructional pressure for the one of the friction engagement elements changes when the instructional pressure for the other one of the friction engagement elements is decreased from the learnt value of the engagement start pressure, and the instructional pressure for the one of the friction engagement elements changes again when the decreased instructional pressure for the other one of the friction engagement elements is increased to the learnt value of the engagement start pressure.

13. An automatic transmission mounted on a vehicle, comprising:
a first friction engagement element that is engaged when a first gear position is realized, and is disengaged when a second gear position is realized;
a second friction engagement element that is engaged when the second gear position is realized, and is disengaged when the first gear position is realized;
shift determination means for determining whether or not a current state is a state in which the automatic transmission does not perform shift, the state involving a predetermined vehicle operation state and an engaged state of one of the friction engagement elements;
learning permission determination means for determining that learning is permitted if the shift determination means determines that the current state is the state in which the shift is not performed; and
learning control means for, if the learning permission determination means determines that the learning is permitted, causing the one of the friction engagement elements to slip by decreasing an instructional pressure for the one of the friction engagement elements, and learning an engagement start pressure of the other one of the friction engagement elements based on a change in a differential rotation of the one of the friction engagement elements, or in a parameter that changes in accordance with the differential rotation of the one of the friction engagement elements, at a time when an instructional pressure for the other one of the friction engagement elements is increased.

14. The automatic transmission according to claim 13,
wherein the learning control means learns an engagement start pressure of the first friction engagement element while coasting in the second gear position.

15. The automatic transmission according to claim 13,
wherein the learning control means learns the engagement start pressure of the other one of the friction engagement elements based on the change in the differential rotation of the one of the friction engagement elements, or in the parameter that changes in accordance with the differential rotation of the one of the friction engagement elements, at a time when the instructional pressure for the other one of the friction engagement elements is increased in a staircase pattern.

16. The automatic transmission according to claim 13,
wherein the learning control means performs feedback control for the instructional pressure for the one of the friction engagement elements so that the differential rotation of the one of the friction engagement elements matches a target differential rotation, and learns, as the engagement start pressure of the other one of the friction engagement elements, the instructional pressure for the other one of the friction engagement elements at a time when the instructional pressure for the one of the friction engagement elements changes to reduce a deviation of the differential rotation of the one of the friction engagement elements from the target differential rotation, the deviation being caused by increasing the instructional pressure for the other one of the friction engagement elements.

17. The automatic transmission according to claim 15,
wherein the learning control means determines that a learnt value of the engagement start pressure is a correct value if the instructional pressure for the one of the friction engagement elements changes when the instructional pressure for the other one of the friction engagement elements is decreased from the learnt value of the engagement start pressure.

18. The automatic transmission according to claim 15,
wherein the learning control means determines that a learnt value of the engagement start pressure is a correct value if the instructional pressure for the one of the friction engagement elements changes when the instructional pressure for the other one of the friction engagement elements is decreased from the learnt value of the engagement start pressure, and the instructional pressure for the one of the friction engagement elements changes again when the decreased instructional pressure for the other one of the friction engagement elements is increased to the learnt value of the engagement start pressure.

* * * * *